United States Patent [19]

Weiß

[11] Patent Number: 4,523,493

[45] Date of Patent: Jun. 18, 1985

[54] TRANSMISSION GEAR FOR TRANSVERSE MOUNTING AND MOTOR VEHICLE WITH TRANSMISSION GEAR MOUNTED THEREIN

[75] Inventor: Heinz Weiß, Bensheim, Fed. Rep. of Germany

[73] Assignee: Deere & Company, Moline, Ill.

[21] Appl. No.: 419,091

[22] Filed: Sep. 16, 1982

[30] Foreign Application Priority Data

Sep. 23, 1981 [DE] Fed. Rep. of Germany ....... 3137805

[51] Int. Cl.³ .................... F16H 37/00; F16H 37/08; F16H 1/42; F16H 57/02

[52] U.S. Cl. ........................................ 74/695; 74/701; 74/700; 74/15.8; 74/15.84; 74/606 R; 74/714

[58] Field of Search ................... 74/15.8, 15.82, 15.84, 74/15.66, 714, 606 R, 740, 694, 695, 700, 701; 180/53 R, 53 B

[56] References Cited

U.S. PATENT DOCUMENTS

| | | | |
|---|---|---|---|
| 806,021 | 11/1905 | Symmonds | 74/714 |
| 1,032,068 | 7/1912 | Krohn | 74/714 |
| 1,704,890 | 3/1929 | Gerson | 74/606 R |
| 1,973,332 | 9/1934 | Church | 74/606 R |
| 2,389,498 | 11/1945 | Gates | 74/714 |
| 2,641,346 | 6/1953 | Risk et al. | 74/606 R |
| 2,645,299 | 7/1953 | Vincent | 74/606 R |
| 2,873,615 | 2/1959 | Wiken | 74/606 R |
| 3,009,369 | 11/1961 | Flinn | 74/701 |
| 3,062,060 | 11/1962 | Hoenick et al. | 74/15.84 |
| 3,204,468 | 9/1965 | Ruoff | 74/15.82 |
| 3,352,166 | 11/1967 | Marquart et al. | 74/15.84 |
| 3,383,953 | 5/1968 | Christenson | 74/714 |
| 3,554,056 | 7/1969 | Cole | 74/15.8 |
| 3,897,699 | 8/1975 | Hoyer | 74/700 |
| 3,915,031 | 10/1975 | Hanson | 74/714 |
| 3,916,711 | 11/1975 | Hoyer | 74/701 |
| 4,019,598 | 4/1977 | Fresmann et al. | 180/235 |
| 4,103,566 | 8/1978 | von Kaler et al. | 74/701 |
| 4,200,006 | 4/1980 | Ehrlinger et al. | 74/714 |
| 4,245,514 | 1/1981 | Miyahara et al. | 74/15.84 |
| 4,318,305 | 3/1982 | Wetrich et al. | 74/357 |
| 4,357,840 | 11/1982 | Winzelier | 74/714 |
| 4,368,650 | 1/1983 | Numazawa et al. | 74/701 |
| 4,417,642 | 11/1983 | Suzuki et al. | 74/740 |

FOREIGN PATENT DOCUMENTS

| | | | |
|---|---|---|---|
| 24100 | 2/1981 | European Pat. Off. | |
| 24454 | 3/1981 | European Pat. Off. | 74/701 |
| 1108571 | 6/1961 | Fed. Rep. of Germany | 74/15.66 |
| 1111033 | 7/1961 | Fed. Rep. of Germany | 74/606 R |
| 1971348 | 10/1967 | Fed. Rep. of Germany | |
| 1285338 | 12/1968 | Fed. Rep. of Germany | |
| 2125628 | 12/1972 | Fed. Rep. of Germany | 74/714 |
| 1230738 | 5/1971 | United Kingdom | |
| 2051265 | 1/1981 | United Kingdom | |

Primary Examiner—Lawrence J. Staab
Assistant Examiner—Michael D. Bednarek

[57] ABSTRACT

A transmission is mounted transversely in an agricultural or construction vehicle with a chassis frame. The transmission components are arranged substantially on two main shafts which are parallel, one to the other, and transverse to the engine input shaft. The drive runs, on the engine side, through a bevel gear drive. The transmission housing is formed of two shells and the plane of the joint therebetween contains the axial centerlines of the main shafts.

8 Claims, 8 Drawing Figures

TRANSMISSION GEAR FOR TRANSVERSE MOUNTING AND MOTOR VEHICLE WITH TRANSMISSION GEAR MOUNTED THEREIN

BACKGROUND OF THE INVENTION

The invention relates to a transmission gear, particularly for transverse mounting in an agricultural or contractor's vehicle.

An agricultural tractor with a transversely disposed main gear transmission gear of the above-mentioned kind is known from DE-AS No. 1285338. In that specification, the driving block unit is of conventional construction and the clutch housing and gearbox casing are fixedly secured by screws on one side to the flywheel housing or the engine crankcase and on the other side to the rear axle housing. In this known block unit method of vehicle construction, the gearbox block unit also assumes, in addition to the gearbox function proper, the load-carrying function of the vehicle chassis. The gearbox casing must have adequate torsional stiffness and load-carrying capacity. The transmission gear, which is formed as a drive block unit, suffers from a lack of compact construction since a main version with three sets of shafts and a bell-shaped clutch housing located on the engine side outside the first set of shafts is shown as the preferred constructional embodiment.

By contrast, it would be desirable to make available a longitudinally compact transmission gear for transverse mounting in an agricultural or contractor's vehicle having a partial or complete chassis frame. Preferably, such a transmission gear will also avoid the disadvantages of the block unit system of construction and will make available methods of production which are flexible in relation to various different customers' and model requirements.

SUMMARY OF THE INVENTION

An object of the present invention is to provide a transmission gear which is longitudinally compact.

The invention is also concerned with a motor vehicle in which the transmission gear offers advantages both from the standpoint of assembly and vibration reduction.

These and other objects are achieved by a transmission gear of the kind initially referred to wherein the gear casing is constructed essentially in the form of two shells and the function plane of these two shells is the plane containing the centerlines of the main sets of a pair of shafts which are arranged according to a modular system of construction. In a preferred constructional embodiment of the invention, the component parts of the transmission gear, including the housing, are made of lightweight construction. The shells of the transmission gear housing, in particular, may be composed of cast iron. In a preferred construction form, the axle driving units, which are driven by the half shafts of the main transmission gear, are fixed on the left and right from outside the vehicle frame to the longitudinal frame members of the latter.

DETAILED DESCRIPTION

Figure 1:
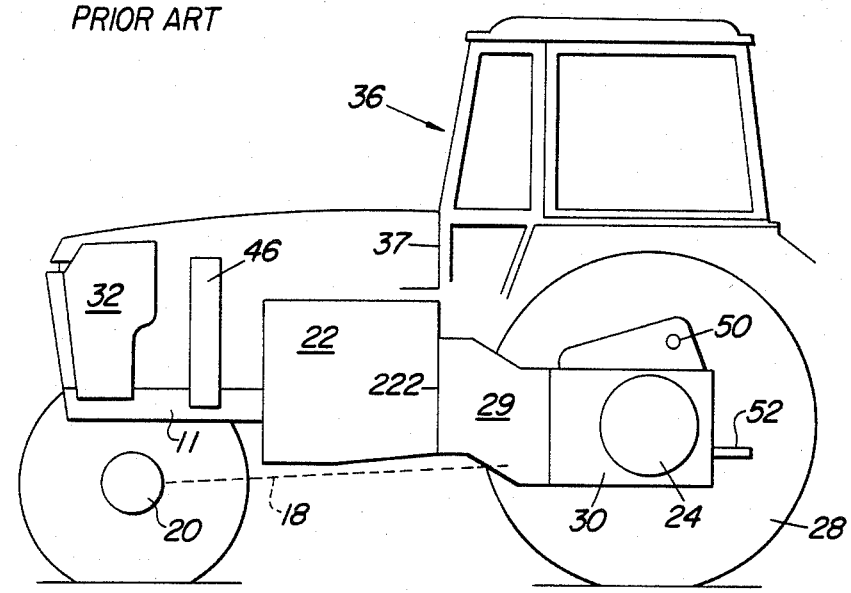
FIG. 1 shows an agricultural tractor, according to the state of the art, in diagrammatic elevation.
Figure 2:
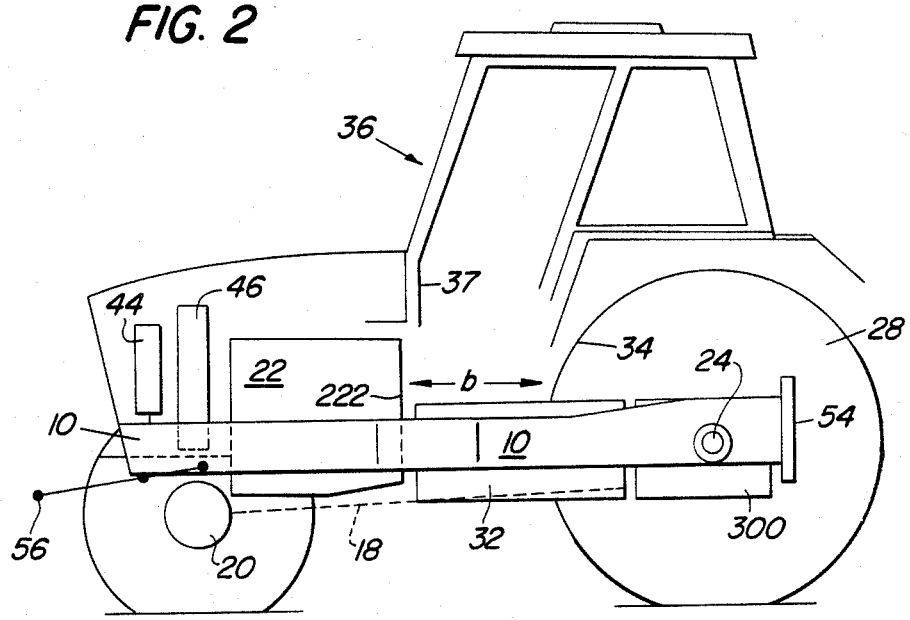
FIG. 2 shows an agricultural tractor, according to the invention of the same overall length, in diagrammatical elevation.

FIGS. 1 and 2 show agricultural tractors in diagrammatic elevation, parallel to the longitudinal axis. The right-hand front and rear wheels can be seen in projection.

An agricultural tractor of conventional construction is shown in FIG. 1. The half frame or front support 11 located above the front axle 20 is visible. Near to or above it are located the fuel tank 32 and the radiator 46. The engine 22 is rigidly fixed to the front support 11. Behind the rear end 222 thereof, which faces the driver's cab, is the position of the front wall 37 of the cab. With a space-saving form of construction, i.e., with a restricted overall length, as well as the relatively large rear wheels which are in use nowadays, a restricted and difficult access to the cabin results.

FIG. 2 shows an arrangement according to the invention, in which space relationships are provided which are more favorable for the accommodation of the components, as well as for a convenient entry into the cabin, while the overall length remains unchanged. For this purpose, the tank 32, which was formerly located in the front, is transferred to the middle region of the vehicle, which, in this case, is provided with a complete full length frame 10. The engine 22 is moved as far forward as possible, i.e., so that it directly adjoins the front axle 20. The desirable forward displacement of the cab 36, compared with the former construction, is normally limited by the position of the rear end 222 of the engine because of the ground clearance which must be allowed for in the cabin. Due to the forward displacement of the engine 22 which has been effected, the cabin 36 can now be correspondingly forwardly displaced, as is apparent from FIG. 2. For the same chassis length and the same wheel base, there is thereby obtained a substantially wider and more comfortable access opening, the width of which is indicated by "b". The distance between the rear end 222 of the engine and the outer edge of the wheel mudguard may amount, for example, to 500 to 800 mm.

Furthermore, there is shown in the left-hand part of FIG. 2, in front of the radiator 46, a ram cylinder 44 which forms part of the integrated front-mounted implement attaching device under the front part of the bonnet. The vertically pivotal levers 56 extend outwardly through slots in the front part of the bonnet. The amount of space gained by the use of a complete frame 10 and the transversely disposed transmission gear 300 for accommodating a large capacity fuel tank 32 and other storage reservoirs for operating materials and machinery, is clearly apparent in FIG. 3. In regard to the tractor shown in FIG. 2, it must be added that it has, in addition to the front implement attachment device 54, a connection with which consideration may be given to a vertical raising and lowering of a plate, or the like, movably mounted in the frame, in which all important mechanical and, if desired, hydraulic attachment means incorporate the usual lifting shaft and power take-off shaft, as shown in connection with the conventional tractor of FIG. 1. Finally, in FIGS. 1 and 2, consideration has been given to the provision as possible additional equipment of the front wheel drive shaft 18 for any kind of mechanical front wheel drive extending forwardly from the gearbox 30 or 300 to the front axle 20.

Figure 3:
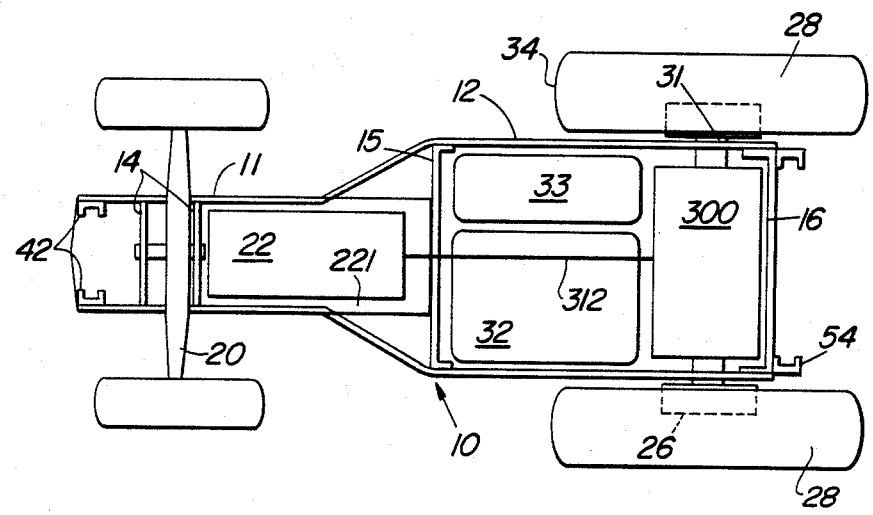
FIG. 3 is a view of the underside of an agricultural tractor, according to FIG. 2.

Referring now to FIG. 3, the front portion 11 of the frame is narrow in order to obtain the largest possible turning circle. In the case of a tractor of adjustable track width, the maximum width of the rear frame portion 12 naturally depends on the narrowest track width. An ideal combination of this overall frame concept is the mounting therein of a transversely disposed transmission gear 300, although a conventional arrangement could also be considered. When a transversely disposed gearbox is used, the maximum width of which corresponds to that of the rear frame portion 12, as shown in FIG. 3, a particularly large space is made available for the reception of a large volume fuel tank 32 and further storage reservoirs for operating materials such as, for example, an oil tank 33. The engine shaft 312 extending from the engine 22 to the transmission gear 300 is only diagrammatically indicated. It is well known that the tank 32 must, if necessary, have a suitable recess in its underside. In general, the representation of the components 32, 33 and 300 is very schematic, this being particularly so in the case of FIG. 4. Thus, for example, the gearbox housing may have, in the region where the input shaft enters it, a bell-shaped bulge for the reception of a clutch (in this connection, see FIG. 8.)

Figure 4:
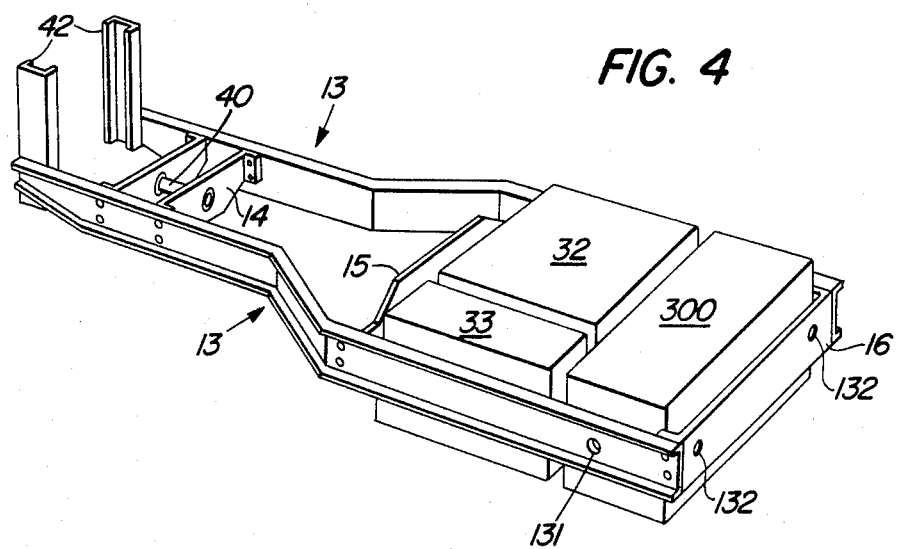
FIG. 4 is a perspective view of the complete chassis frame, the possible positions of the most important components in the rear region of the frame being indicated in an extremely diagrammatic manner.

In FIG. 3, the half shafts extending to the left and right from the gearbox are indicated by 31 and the wheel axle driving gear units by 26. The openings 131 provided in the frame for the half shafts 31 are shown in FIG. 4, as well as openings 132 for the attachment of a rear vertical lifting frame 54 for the lifting device, which is similar to the front lifting beams 42, shown in FIG. 3, for the front mounted implement attaching device. The front axle may be mounted on the bolt 40 which is engaged in the double cross-member 14. The engine 22, as is clear from the left-hand part of FIG. 3, directly adjoins this cross-member. It is normally enclosed by a sound-damping jacket 221. In the case of a modular type of construction for the entire concept, the whole of the vehicle frame is so dimensioned that the width of the front part of the frame 10 and the distance of the front axle to the intermediate cross-member 15 is sufficient to be able to receive an engine of the maximum size which is applicable to this class of vehicle. The engine 22 may be fixed to the longitudinal beams 13, but it is preferable to mount it in a cantilevered manner on the cross-member 15, especially with the use of oscillation-dampening elements. The arrangement of further components and conduits is not shown in detail. Since it lies in the discretion of the expert and needs no precise explantion.

FIG. 4 shows, in perspective, the verticle frame used in FIGS. 2 and 3. Clearly shown in the front region is the front cross beam 14 with the supporting bolt, as are also shown the intermediate and rear cross beams 15 and 16. The longitudinal beams may be either riveted to the cross beams or alternatively screwed to them. The same applies to lifting beams 42 and 54. The rear lifting beams are not shown in FIG. 4, only pre-formed openings 132 for the riveting or screwing of the same. As shown, the longitudinal beams 13 preferably have a U-shaped cross-section and are assembled so that they are disposed symmetrically with respect to each other. The dimensions and strength of the material must be made to suit the type of vehicle.

In connection with FIG. 4, it must be added that the components 32, 33, 300 may be partly or wholly covered by a cover plate (not shown) which, if desired, may, at the same time, form the floor of the driver's cab. This cover plate may, according to the weight distribution of the other components, if necessary, perform a weight equalizing function and may be made in the form of a cast plate of differential weight. This cover plate is advantageously supported on the frame 10. If the components project above the upper edge of the frame 10, as shown in FIG. 4, the cover plate may be formed as a plate which is not flat, but must have a bent margin or be supported via intermediate blocks.

Figure 5:
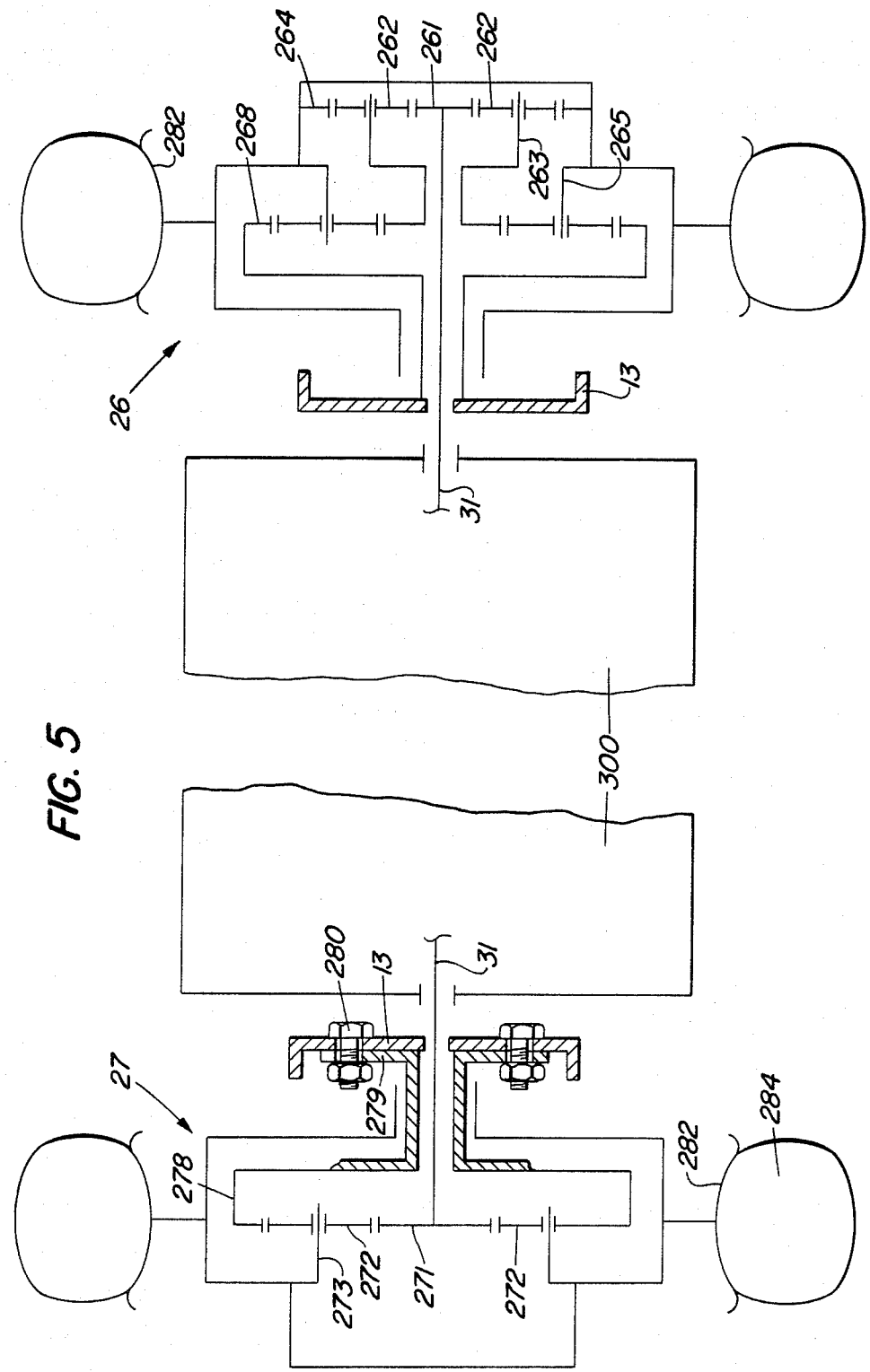
FIG. 5 is a schematic representation of the main transmission gear/axle-driving unit and of the arrangement thereof in relation to the rear portion of the frame and the rear wheels, shown partly as a section in the vertical plane.
Figure 6:
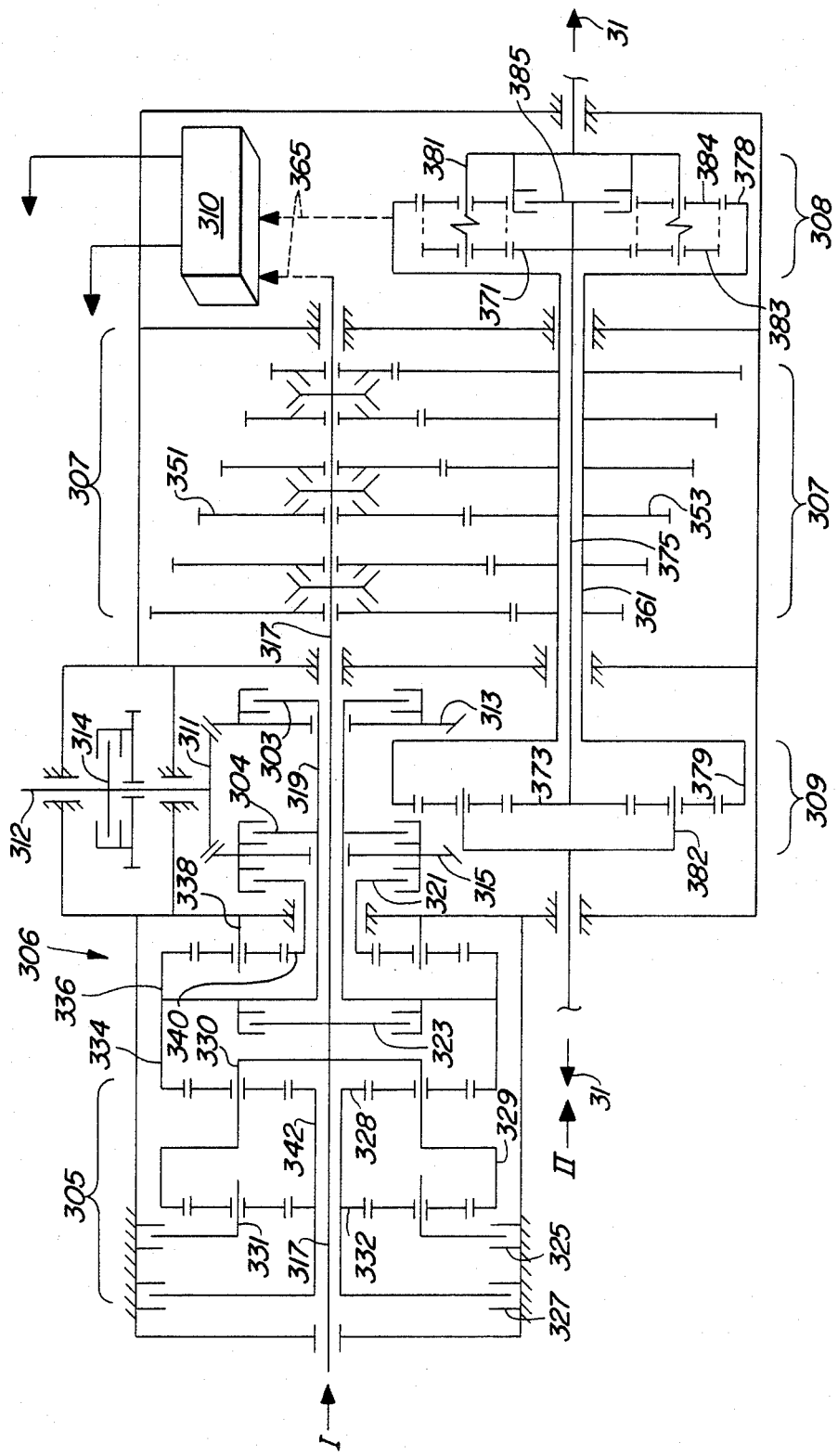
FIG. 6 is a schematic representation of the main gear box sectioned in the plane defined by the centerlines of the main shafts.
Figure 7:
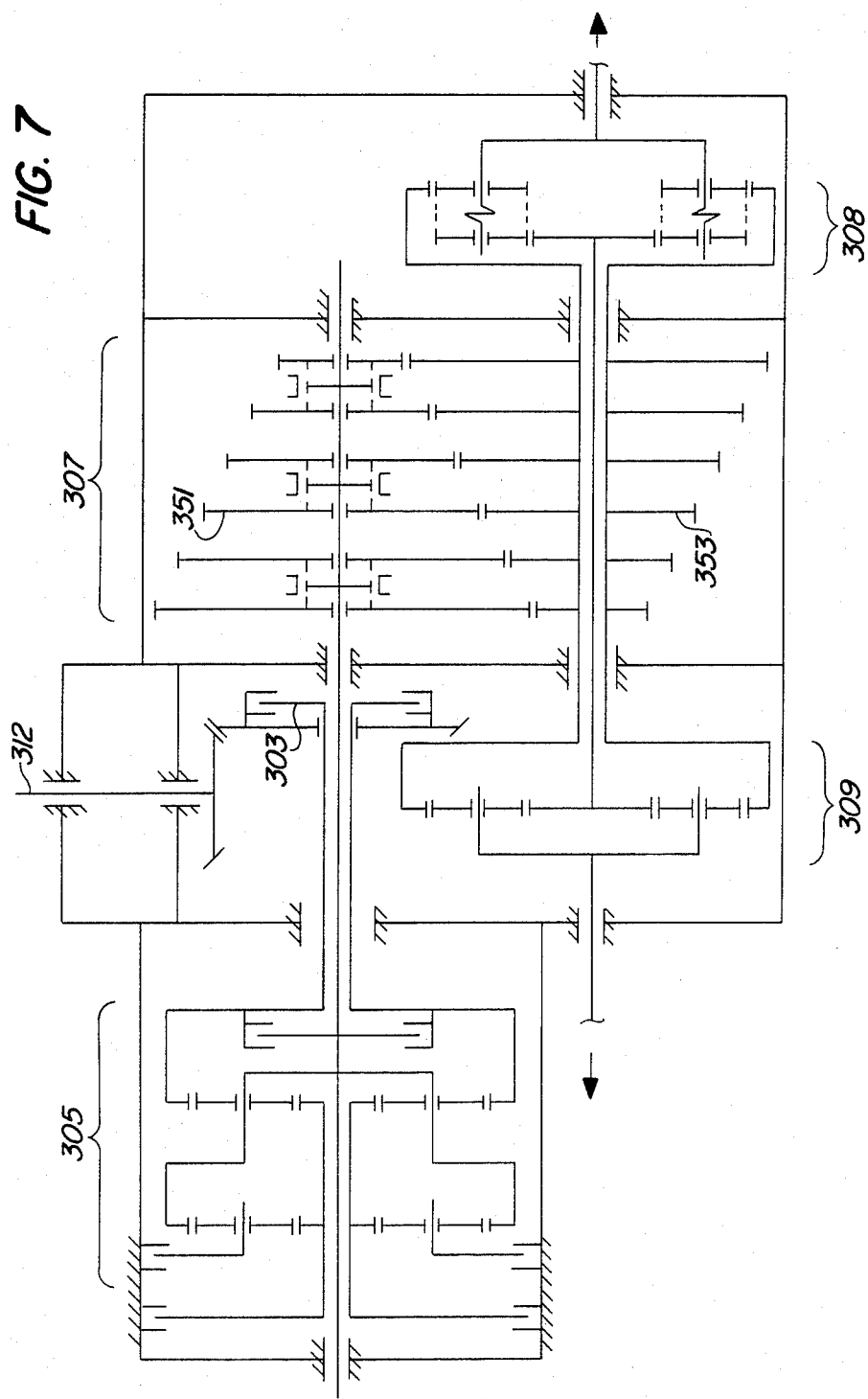
FIG. 7 is a simplified representation of the main transmission gear similar to that of FIG. 6.
Figure 8:
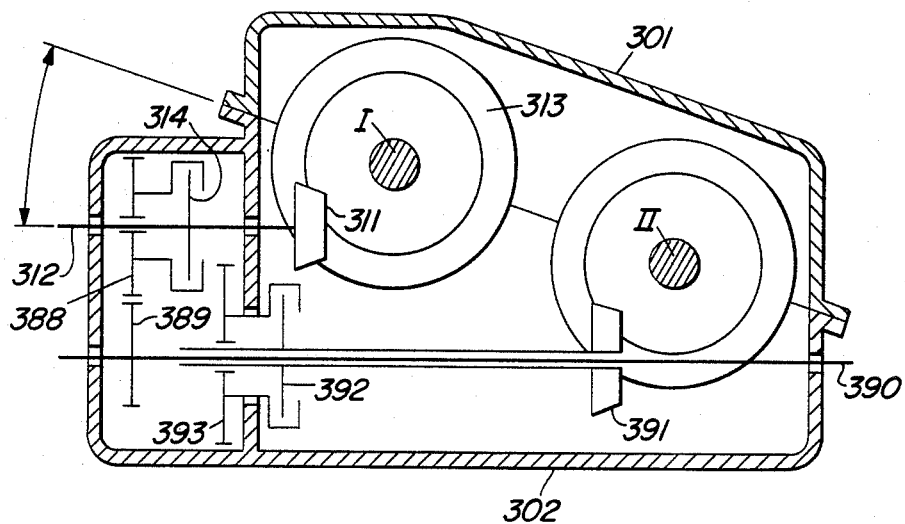
FIG. 8 is a vertical section through the transmission gear housing, taken in the longitudinal direction of the vehicle.

In the figures which follow, particular emphasis is now placed on the mounting and construction of the gearbox 300 in the region of the rear portion 12 of the frame. FIG. 5 illustrates the overall concept of the transmission gear and especially the layout of the final drive units 26 and 27, as well as the wheel axle driving units which are integrated within the wheel rims and which are preferably made in the form of epicyclic gears. FIGS. 6 to 8 are restricted to a main transmission gear concept which is particularly suitable for the previously shown overall concept and which basically can also find applications on its own, i.e., independently of the arrangement of the other components and of the construction and design of the frame as a whole, especially also with regard to the field of ordinary land vehicles, such as agricultural tractors and industrial vehicles.

FIG. 5 shows a schematic vertical section of the rear axle driving means. In the middle is shown the main transmission gear 300 and on the left and right can be seen the rear axle driving units 26 and 27, which have the form of epicyclic gears. On the left-hand side, there is shown a one-stage epicyclic gear 27 and on the right-hand side, a two-stage epicyclic gear 26. It is to be understood that only left-hand and right-hand, two-stage epicyclic gears or left-hand and right-hand one-stage epicyclic gears can be combined with each other. The differing representation shows two different constructional possibilities. The epicyclic gears 26 or 27 have a fixed transmission ratio and are drivably connected with the half shafts 31 extending outwardly from the differential. The sun wheel 261 or 271 is normally integral with the corresponding drive shaft or half shaft 31.

The sun wheel 271 is in mesh with the planet wheels 272 which are mounted in a planet carrier 273. When the sun wheel 271 rotates, the planet wheels 272 roll on the interior gear teeth of the annulus 278. At the same time, the planet carrier 273 is driven together with the rear road wheel in the same direction of rotation as the sun wheel 271. In this way, the driving wheels or rear wheels receive a drive with a reduced rotational speed and an increased torque. This applies to an increased extent in the case of the two-stage epicyclic gear 26 shown on the right-hand side, where the planet carrier 263 also forms for its part the sun wheel for the second stage which is shown on the left of the first stage. The planet carrier 263, by means of the sun wheel portion thereof, drives the planet carrier 265 of the second stage which, in turn, is rigidly connected with the annulus 264 of the first epicyclic gear and the rim 282 and drives the rear road wheel 28.

The supporting and fixing of the rear axle or epicyclic gears 26, 27 is effected via the hollow wheel housings 268, 278 that carry the respective annuli. The hollow wheel housings each have a flange which, in the case of the one-stage epicyclic gear 27 shown on the left, is indicated by the reference 279. The epicyclic final drive is connected by this flange 279 to the rear portion of the frame of the vehicle or to the longitudinal side members 13 thereof, and more particularly, by means of screwing 280. The manner of fixing is not shown in detail on the right-hand side.

The mounting of the half shafts 31 is effected adjacent the main gearbox via planet carriers of the spur gear differentials 308 and 309 (see FIG. 6) and is effected adjacent the road wheel drives via the sun wheels 261 and 271 which are fixed for rotation with the half shafts 31 in a self-centering manner within the planet wheels 262 and 272. The half shafts 31 are sealed against escape of oil by means of shaft-sealing rims (not shown) both with respect to the main gear box 300 and also with respect to the rear axle driving units 26 and 27. The planet carriers 265 and 273 are rotatably mounted with respect to the stationary hollow wheel housings 268 and 278. It would be possible to combine and support the planet carriers 263, 265 and 273 otherwise than as shown. The planet carrier 273 is advantageously formed integrally with the wheel rim 282 which rotates the tire 284. The same holds true for the axle driving unit shown on the right-hand side as a two-stage epicyclic final drive unit.

It is to be understood that this construction and fixing of a road wheel axle drive can have applications for front wheel and rear wheel drives independently of the construction of the main transmission gear 300.

FIGS. 6 and 7 are each concerned with the schematic view of the main transmission gear, taken approximatey in the function plane of the housing parts which is shown in FIG. 8. This plane is inclined with respect to the input shaft 312. The preferred modular type of construction is apparent from a rough comparison of FIGS. 6 and 7 which are formed basically from the same components. FIG. 7 lacks some additional possibilities which are offered by the relatively more versatile gearbox of FIG. 6. Accordingly, the space provided therefor in the similarly constructed housing remains unused (see particularly the reference numerals 304, 306 and 310).

The main gearbox 300, according to FIGS. 6 and 7, is constructed so as to attain the desired small longitudinal structural depth which results from having only two shafts I and II which extend parallel to each other. It would also be possible to arrange some of the components on a third shaft or to arrange a third shaft as an auxiliary shaft, but the space saving arrangmenet of only two shafts is advantageous and is a special characteristic of the transmission gear, according to the invention.

The left-hand part of FIG. 6 shows an input side, two-stage epicyclic gear unit 305 having a load-responsive gear change and adjoining the right-hand side of this unit, an extra low ratio gear unit 306. In the middle part, the input shaft 312 enters from the top with a power take-off shaft clutch 314 located at the input of the transmission gear. The power take-off shaft, itself, is not visible and is located beneath the plane shown (see FIG. 8). The engine side input shaft 312 extends downwardly in the drawing and ends in a rotationally fixed connection with a driving bevel gear 311. This is in mesh with the bevel gear 313 of the main clutch 303 as well as with the bevel gear 315 of the reversing clutch 304. The bevel gear 315 is located on the left-hand side opposite the bevel gear 313. Both bevel gears 313 and 315 act in opposite directions of rotation on the input side line of shaft I. On the right-hand side of the clutch part, there is shown a six-stage synchromesh change-speed gear 307 which acts on the output side of shaft II. The output side gear wheels of the change speed gear (e.g. 353) are flanked on the right and left by one-half each of the spur gear differential 308, 309 which is constructed in two parts. The half shafts 31, which are located in axial alignment with the main line of shafts II, extend outwardly from the left and right spur differential gear halves to the wheel axle drive gear units (not shown).

The gear arrangements on the line of shaft I, which are shown in FIG. 6, make possible, in conjunction with the clutches 303 (forward) and 304 (reverse) 3×6=18 forward speeds and an equal number of reverse speeds. In this connection, no account has so far been taken of the extra low ratio gear unit 306 which again, by means of a gear ratio reduction of, for example 1:4, makes available a further range of 18 extra low ratio speeds.

After this general survey, the transmission gear, according to FIG. 6, will now be described in detail.

The input shaft 312 is provided on its end with the bevel gear 311 which is fixed for rotation with it and which, in turn, is in mesh with two helically toothed bevel gears 313 and 315 disposed opposite each other in mirror image relationship. These bevel gears 313 and 315 are mounted so as to be freely rotatable on the hollow shaft 319 and can be selectively locked with respect to the latter by means of the main clutch 303 or the reverse clutch 304, which preferably have the form of plate clutches or multi-disk clutches, in order to rotate the hollow shaft 319 in one direction or the other.

In the region of the epicyclic input side gear unit 305, the hollow clutch shaft 319 terminates in a hollow double annulus unit 334, 336 which is fixed for rotation with it. The annulus portion 336 of this double annulus rotates round the planet carrier 338, which, in turn, is fixed to the transmission gear housing. The double annulus 334, 336 is located alongside the extra low ratio gear unit 306 which, in turn, is located between the input side epicyclic gear unit 305 and the reverse clutch 304. The sun wheel 340, which is in mesh with the planet wheels on the planet carrier 338, is loosely mounted on the hollow shaft 319 and can be coupled with the bevel gear 315 so as to become fixed for rotation therewith by engaging the clutch 321.

The double hollow double annulus units 334, 336 also constitute a support for the clutch 323 by means of which a clutch disk or the like, fixed for rotation on the drive shaft 317, can be coupled with the unit 334, 336 so as to establish a direct drive (third) ratio. The annulus 334 of the hollow unit 334, 336 is in mesh with the planet wheels on the planet carrier 330 of the first (inner) stage of the input side epicyclic gear unit 305. The planet carrier 330, in turn, is extended leftwardly into the second stage so as to form the annulus thereof. The planet wheel carrier 330 is fixed for rotation with the drive shaft 317.

The sun wheels 328, 332 of the two stages are fixedly mounted on a commom hollow shaft 342 which, in turn, is mounted on the drive shaft 317 located within it. The hollow shaft 342 can be held stationary by means of the brake 327, and the planet wheel carrier 331 of the second stage by means of the brake 325. Both brakes are preferably fixedly mounted on the housing.

The power flow will now be explained with reference to the left-hand part of the drawing.

The input side gear unit 305, which consists of two epicyclic stages and has a load-responsive gear change, is advantageously constructed on the unit construction principle from uniformly dimensioned sun wheels, planet wheels, annuli, etc. It makes possible, according to which of the two brakes 325, 327 is operated, two gear ratio reductions in the sense of a reduction in the rotational speed of the shaft 317. When the brake 327 is engaged, the sun wheel 328 of the inner epicyclic stage is stationary, so that the corresponding annulus 334, which is drivably connected with the clutch shaft 319, drives the planet wheel carrier 330 in the same direction of rotation as the shaft 319. When the brake 325 is engaged, the planet carrier 331 of the second stage is held stationary and since the sun wheels 328 and 332 are coupled together by a hollow shaft 342, a gear ratio reduction in the sense of a lower rotational speed is produced via the planet carrier 330. The direct third speed is engaged by the clutch 323, the input side epicyclic gear unit 305 then being out of operation. The shafts 319 and 317 are coupled together for the direct drive and rotate at the same speed.

Basically, it is within the scope of the invention to make use of various different known two-stage epicyclic gears. The epicyclic gears of the kind illustrated incorporate no reverse gear. This is, however, provided for by the reverse clutch 304. If the reverse function is not provided for the transmission gear (see FIG. 7), then the reverse speeds can be provided by means of a further clutch (not shown) in conjunction with the brake 325.

The extra low ratio gear unit 306 is brought into operation by engaging the clutch 321. Thereupon, the bevel gear 315 drives the sun wheel 340 which is mounted so as to be freely rotatable on the hollow shaft 319. The sun wheel 340, in turn, is in mesh with the planet wheels on the planet wheel carrier 338 which is fixed to the housing. The backward direction of rotation produced by the sun wheel 340 on the input side is reversed by the hollow unit 334, 336 rotating in the opposite direction, the annulus 336 of which is in mesh with the planet wheels of the extra low ratio gear unit. The annulus 336 of the hollow unit, which is thus driven at a considerably reduced gear ratio, now drives the epicyclic gear unit 305 via the annulus 334 at a correspondingly reduced rotational speed. Thus, there are provided additionally 18 slow forward speeds. In the same way as the input side gear unit 305, the extra low ratio gear unit 306 is constructed as a module of the main transmission gear and, so far as possible, from components which are of the same construction and dimensions as the other components of the main transmission gear.

According to how the gear changing possibilities described above are operated, including the clutches or brakes 303, 304, 321, 323, 325, 327 (of which 303, 304, 321, 323 are operable under load), the drive shaft 317 is driven with various different reduction ratios and directions of rotation by the two gear units 305 and 306 which are arranged on the input side of the change speed gear unit 307. In fact, there are available to the driven shaft 317, at the input end of the shaft I, three reverse stages (without an extra low ratio speed) and $2 \times 3 = 6$ forward stages (including the extra low ratio gear unit), which can then be further modified and multiplied in the multi-stage (here e.g., six stage) change speed gear unit 307.

The driven shaft 317, which can be driven in the manner described above, is extended into the right-hand half of FIG. 6 into the change speed gear unit 307 which, in this case, has six stages. In the case illustrated, there is shown a sliding sleeve synchromesh gearbox with pairs of gear wheels in constant mesh with each other in which the gear wheels, e.g. 351 on the input shaft are arranged so as to be freely rotatable on the shaft 317 and so as to be capable of being individually drivably connected to and disconnected from this shaft by means of a respective synchromesh sleeve. The corresponding gear wheels, e.g. 353, on the output shaft 361, which, in this case, is a hollow shaft, are all rigidly mounted on shaft 361 so that all these gear wheels continuously rotate together. The gradation of the gear ratios in the change speed gear 307 are so matched with the requirements of the input side epicyclic gear unit 305 that an uninterrupted regular gradation of speeds is obtained with an interval ratio of preferably about 1.20.

The synchronization of the change speed gear unit may, as shown in the drawing, be effected by means of cones and baulk rings. In a known manner, the baulk ring, which is displaced by friction by the synchromesh sleeve via the selector, lies in contact with the conical extension of the gear wheel. Synchronization is effected by accelerating or slowing down the gear wheel and the synchromesh sleeve which, after passing between the teeth of the baulk ring, engages in the lateral ring of teeth on the gear wheel. In general, the use of gear wheels having helical teeth is to be recommended for noise reasons. A more expensive synchronizing system is the engine synchronizing system which is also shown in FIG. 6. In this case, the main input and output shafts 317 and 361 are adjusted and synchronized with each other by means of rotational speed sensors which are indicated by the reference numeral 365. The adjusting pulses, which are transmitted to the adjusting means, are indicated by solid line arrows. In order to attain synchronous running when changing down, the engine governor is supplied with control pulses in the sense of an increase in rotational speed, whereas, in order to attain synchronous running when changing up, the reverse clutch 304 or one of the brakes 325 or 327 is acted upon for a short time by control pulses in the sense of a reduction in rotational speed. When the synchronous running of the associated gear wheels and shafts is attained, the synchromesh sleeve can be manually or, if appropriate, automatically slid across without any shock so that the gear wheel of the next gear ratio becomes positively engaged with the shaft 317.

A characteristic feature of the transmission gear, which is crucial for the compact two-shaft construction, consists in the two part construction of the spur wheel differential, the sun wheels 371, 373 of the two halves 308, 309 of which are rigidly interconnected by a differential shaft 375 located within the hollow output shaft 361. The hollow shaft 361 is supported or mounted on the left- and right-hand sides of the series of gear wheels on the output side of the change speed gear unit 307 in correspondingly located partition walls of the housing. The shafts 361 and 375, which are located one within the other, constitute the output side set of shafts II. This set of shafts is extended axially outside the housing of the transmission gear into the left- and right-hand half shafts 31 driven by the differential halves 308 and 309. The drive of the differential gear 308, 309 is obtained via the hollow shaft 361 which is connected to the respective annuli 378, 379. The drive is transmitted via the left and right planet wheel carriers 381, 382. The differential action is obtained by the two rigidly interconnected sun wheels 371, 373.

In detail, what takes place is as follows. The hollow output shaft 361 drives the two planet carriers 381, 382 of the divided spur gear differential 308, 309 via the left and right annuli 378 and 379, respectively. The drive is thus transmitted via the planet carriers 381, 382, If the output torque of the rear axle drives is equal, the differential shaft 375 will be in equilibrium and will remain stationary with respect to the differential halves. If, however, unequal output torques appear at the rear wheels, then the rear wheel, which is running more easily, will thereby attain additional speed because the sun wheel 371 or 373 of the oppositely located differential half, due to the higher torque, introduces additional rotation via the differential shaft 375.

So far as the right-hand differential half 308 is concerned, it must be added that the planet wheel carrier 381 has two sets of planet wheels 383, 384, which are of known type. The inner set 383 meshes with the sun wheel 371 and the outer set 384 meshes with the annulus 378. The sun wheel 371 can be locked for rotation with respect to the planet wheel carrier 381 by means of a differential lock 385. The differential shaft 375, which interconnects the two halves 308, 309 of the differential, passes through the interior of the hollow output shaft 361.

A conventional bevel gear differential could be provided instead of the spur gear differential. The bevel gear differential would then be driven by one of the gear wheels on the shaft 361, e.g., by the gear wheel 353. The arrangement previously described is, however, more advantageous.

The transmission gear shown in FIG. 6 constitutes a fully equipped and universally applicable combination which takes account of all functions of agricultural tractors, including operation in reverse, such as is desirable in front loading operations.

The gear changing and use of the transmission gear, described above, when driven in reverse, will now be considered in greater detail. In this case, the clutch 321 for the extra low range of speeds and also the clutch 314 for the power take-off shaft are disengaged or out of operation. A typical reverse drive, for example, so far as the epicyclic gear 305 with load-responsive gear change is concerned, is obtained by engaging the plate clutch 323 by means of oil under pressure. The third gear or the third ratio in the change speed gear 307 is obtained by displacing the corresponding synchromesh sleeve. The transmission gear then produces a torque as soon as the main clutch 303 or the reverse clutch 304, each of which preferably has the form of a multi-disk clutch, is operated by the application thereto of oil under pressure. This can take place alternately for forward and rearward travel without any further gear changing operation so long as the speed and torque of the speed reduction concerned are suited to the prevailing conditions.

At this point, it should also be observed that the transversely disposed transmission gear, according to the invention, is suited for operation in reverse using two clutches composed of identical component parts. This results from the fact that the two clutches are on the input side of the transmission gear, where the speed of the motor shaft is relatively high and the torque is relatively low. This loads the input side bevel gear drive 311, 313, 315 less heavily than the bevel gear drive in conventional longitudinally disposed transmission gears, which is located on the output side. Thus, the clutch-associated bevel gears 313 and 315 can be laid out favorably to suit the input torque.

The main and reverse clutches 303, 304 take over the function of the main or disconnecting clutch which is otherwise provided on the input side for interrupting the drive line for the gear changing or synchronizing operation. The intermediate shaft, which was necessary in previous transmission gears with a reversing clutch, as well as the intermediate gear wheel for reversing the direction of rotation of the input side gear shaft, are likewise dispensed with. Thus, a substantial structural simplification is obtained with a more compact form of construction.

If one is prepared to forego this possibility of driving in reverse or the availability of a plurality of reverse speeds, then the reverse clutch 304 can be dispensed with, as shown in FIG. 7. The simplified transmission gear, according to FIG. 7, which is nevertheless assembled on a modular basis using like components or elements, also includes no extra low ratio gear unit 306 and no differential lock 385. In this case, the reverse drive function may be obtained, particularly in known manner, by an additional means (not shown) in the auxiliary gear unit 305.

In connection with FIG. 7, it must be noted that in this case, only a few reference numerals, basically corresponding to those in FIG. 6, have been inserted insofar as they relate to what has previously been described. Moreover, the change speed gear unit 307, shown in FIG. 7, which once again has six gear ratios, is a gear unit with simple dog clutches for effecting gear changes.

In the design of the transmission gear, including the main gearbox unit 300 and the rear axle drive units 26, 27, the correct combination of step-up ratios and step-down ratios is of importance. It should be mentioned in this connection that the main tranmission gear 300 can be utilized in conjunction with a two-stage reduction gear in the rear axle drive of a vehicle in the upper power output range, e.g., a vehicle of the agricultural tractor family. In the lower power output range, however, a single-stage, epicyclic gear unit is preferred, mainly for reasons of cost, in which case the matching of the speed must be obtained by the input bevel gear having a suitable gear ratio. It is further to be understood that the construction of the main gear uit 300 may differ from that shown in FIGS. 6 and 7, especially since in this case, the modular and lightweight construction enables a large amount of free space to be provided, which, in turn, enables the various different requirements of customers in regard to manner of operation, comfort and price to be taken into account.

FIG. 8 shows the transversely disposed main transmission gear, according to FIGS. 6 and 7, in vertical section longitudinally of the vehicle, approximately in the plane of the input shaft 312.

The main gearbox housing 301, 302 is made of lightweight construction, which normally necessitates the combination with a frame or frame parts 12 which receives the supporting forces and the reaction moments produced by the road wheels. The housing is constructed in the form of two shells. The upper shell 301 of the housing and the lower shell 302 thereof abut each other in a function plane which contains the axes of the sets of shafts I and II. This has advantages in relation to fully mechanical production of the transmission gear, but also has advantages in the case of repairs when the transmission gear is dismantled. This is particularly the case when only one shell of the housing is fixed to the frame, especially somewhat below or above the flange on the rear wall of the transmission gear, which flange may, with advantage, be secured in overlapping relationship to the cross member 16 (see FIG. 8). It is then sufficient to remove one of the parts of the housing without having to dismantle the entire transmission gear. However, this last mentioned operation is relatively simple to carry out. The two halves of the housing may, in particular, be made of cast iron. It is moreover basically also possible for the housing of the transmission gear to be assembled from more than two housing shells. In the left part of the drawing can be seen an outwardly bulged portion of the lower housing part which preferably extends only in the region of the input shaft 312 and contains, for example, a clutch 314 for the power take-off shaft. The bevel gear 313 of the main clutch can be seen behind this clutch 314. The drive of the power take-off shaft 390, which, if necessacy, may project outwardly from the housing at both the front and rear ends thereof, is obtained via the clutch 314 and the gear wheel 388 to the gear wheel 389, which is fixed for rotation with the power take-off shaft 390. The constructional arrangement illustrated is one which is suitable for tractors with an additional mechanical front wheel drive. In the vicinity of the set of shafts II on the output side, there is shown a bevel driving pinion 391 which has an extension in the form of a hollow shaft through which the power take-off shaft 390 extends. The front wheel drive shaft, itself, which is located below the plane of the drawing, is drivable via the clutch 392 and the associated gear wheel 393. The bevel driving pinion 391 is in mesh with the bevel gear wheel, shown in projection, which may, for example, be formed integrally with the annulus 379.

The angle of inclination of the plane containing the axes of the two sets of shafts I and II is of importance. This plane forms with the vertical an angle of about 30 to 80 degrees, preferably an angle of about 60 to 75 degrees. The housing is normally installed so that the lower half 302 thereof assumes a position in the frame or in the vehicle with its bottom wall substantially horizontal. If the angle of inclination is too steep, the power take-off shaft 390, which must be substantially horizontally disposed, will no longer be able to be mounted in the right-hand lower part of the housing. If, however, the plane of the sets of shafts I and II is too level, obstructions may occur in the left-hand part of FIG. 8, particularly in regard to the introduction of the input shaft 312. If a relatively steep angle is chosen for the mounting of the sets of shafts I and II and correspondingly for the junction plane of the housing parts, fixing of the upper housing part 301 to the rear wall located on the right of the drawing may be advisable, this fixing perferably being to the cross member 16 of the vehicle frame.

The above-mentioned features, in combination with the small structural depth in the longitudinal direction of the vehicle due to the arrangement of essentially only two main sets of shafts, provide, above all, technical and production-related advantages. As a result of the subdivision of the transmission gear housing, it is made possible mechanically to insert and mount, in the housing, the main sets of shafts, together with all the gear wheels, which, to a large extent, are made available and preassembled on a modular basis.

The two shell portions of the housing are usually not symmetrically shaped, especially since the function plane forms an angle of 10 to 60 degrees, especially 15 to 30 degrees with the axis of the input drive shaft or cardan shaft on the side thereof nearer the engine. This is a feature which provides a structurally more favorable arrangement in regard to the position of the input drive shaft and a front wheel drive shaft, which may possibly be provided, as well as power take-off shafts.

It is basically possible to divide the housing in a further plane other than that already referred to, approximately in the region of the bell-shaped clutch housing on the side adjacent the engine, but it is nevertheless possible to obtain advantages with the exclusive two-shell construction. In any case, the provision of three joints should be avoided.

Preferably, the arrangement of the component parts of the transmission gear is such that the latter is substantially longer in the lateral direction, particularly at least one and a half times longer, than in the longitudinal direction of the vehicle. By this means, the space within the appropriate part of the vehicle frame in which the transmission gear is to be installed is better utilized and space is gained for the other components of the vehicle, especially those that have to be accommodated within the vehicle frame, such as, for example, the arrangement of a large volume fuel tank.

The small structural dimension in the longitudinal direction of the vehicle also results from the fact that the main clutch associated with the transmission gear is not positioned in a space-consuming manner on the input side of the transmission gear, as was hitherto customary, but is positioned on the output side of the engine side driving bevel gear wheel, and is incorporated in the input side main set of shafts.

Furthermore, it is possible to incorporate a bevel wheel reverse gear in the input side set of shafts, the bevel gear wheels of which are freely mounted on the hollow shaft belonging to the input side set of shafts and are selectively engageable by means of the main clutch or the reverse clutch which is additionally available in this case, so as to drive the hollow shaft in either a forward or rearward rotational sense. In this case also, the provision of a main clutch on the input side adjacent the engine may once again advantageously be dispensed with. The operation of disconnecting the drive from the drive line is taken over by the clutches in the input side set of shafts.

At this point, it should be added that the use, which is known, per se, of a transversely disposed transmission gear, because of the relatively high rotation speeds and the consequent relatively low torques, make possible a construction of the bevel gear and of the associated clutches which is favorable both in regard to space and cost, which, unlike the construction, according to the state of the art referred to earlier, is fully utilized.

Since the transmission gear housing is preferably provided with a suitable amount of free space and a sufficient number of supporting positions or partition walls, it is possible to make extensive use of the modern modular method of construction. That is to say, the component parts of the transmission gear, including gear wheels, planet wheel carriers, clutch disks, bevel gears, etc., are, to a large extent, so formed that simpler and technically more versatile combinations of gears can be assembled from a relatively small number of standardized individual component parts. Thus, the clutch and the reverse clutch may consist of identical standardized components arranged in mirror image relationship to each other, the shafts of the individual components of the transmission gear may be prepared for rotationally fixed connection in the axial direction. Also, a number of modifications can be made in connection with the synchronization of the gear unit, within the meaning of modular construction. Thus, the gearbox, which, for example, has six gear ratios, is in the simplest case provided with dog clutch sleeves or even additionally with synchromesh rings or it may be provided, according to a special construction of the invention, with a novel form of engine synchronization.

It is clear that other transmission gear components can be connected with the transmission gear components that are necessary for a main transmission gear, and hence, with the change speed gear and the differential gear. Such other transmission gear components could include, in particular, an auxiliary extra low ratio gear unit having a load-responsive gear change. These other transmission gear components may be incorporated in the input side main set of shafts. In principle, it is also possible to provide the output side set of shafts with transmission gear components which can be connected up without departing from the scope of the invention.

In general, provision is made for the two half shafts, which are axially aligned with the output side set of shafts and are coupled together by the differential gear, to be extended outwardly, directly and in axial alignent to the road wheels or to the axle driving gear units thereof. This presupposes a suitably determined position of the transmission gear and wheel axles which, in most cases, can be obtained. Basically, however, the axial alignment can be dispensed with, taking into account a given amount of increased expenditure.

The arrangement of the various component parts of the transmission gear or, as far as possible, only two sets of shafts, usually means that after the transmission gear has been fitted out, a relatively large dimension is produced in the lateral direction in order to achieve a very small structural depth in the longitudinal direction. The invention also has a particularly favorable feature in that its right-hand and left-hand axle driving gear units are not incorporated in the main transmission gear housing, but are, on the contrary, positioned outside so as to form driving units with the wheel rims. Such a feature was formerly known only in connection with front wheel drives, with reference to the front wheels. It is, however, particularly advantageous in agricultural tractors with their very large rear wheel rims.

The installation of the transmission gear, according to the invention, is naturally particularly suitable for all motor vehicles with a frame provided at least in the region of the installation of the transmission gear, and preferably for all motor vehicles with a complete frame which must be made relatively wide in the region provided for the transmission gear. Moreover, the use of the transmission gear, according to the invention, is not limited to the installation in the region of the rear axle, even though the arrangement of the transmission gear in the region of the rear wheels between the rear frame members is of particular importance in the case of agricultural tractors. On the other hand, however, front loaders with relatively large front wheel rims are also suitable, particularly if the front wheels are rigidly connected to a partial front frame and the steering is effected by means of the rear wheels.

In all these cases, it is important that the transmission gear is not incorporated in the conventional building block system of construction, but can be secured to the vehicle frame largely without having to perform a supporting function and hence, without having to satisfy increased requirements in relation to load-carrying capacity and torsional stiffness, etc. In this way, all the component parts of the transmission gear, including the housing, can advantageously be made of lightweight construction with the corresponding advantages so far as cost and weight are concerned.

The mounting of the axle driving units within the rims of the road wheels, which rims are usually made of large volume, in the case of agricultural tractors, usually in the rear wheels, avoids, in addition, an impairment of the ground clearance and furthermore, produces only very small moments of force, whereby the stresses on the housing and the bearings, otherwise caused by the forces arising from the road wheels, are kept very low. By relieving the load on the components of the transmission gear from the corresponding forces, a longer working life of the main transmission gear/axle-driving unit is obtained. It must added that the construction of the transmission gear in the form of two or more shells also offers corresponding advantages so far as maintenance is concerned.

I claim:

1. A transmission for transverse mounting in a vehicle having an in-line engine, the transmission comprising:
   a longitudinal engine-driven shaft;
   a hollow shaft driven by the engine shaft;
   a transverse shaft extending through the hollow shaft, the hollow shaft driving the transverse shaft;
   a range gear disposed on one side of the engine shaft, the hollow shaft driving the transverse shaft via the range gear; and
   a change-speed gear driven by the transverse shaft and disposed on the side of the engine shaft opposite from the range gear.

2. In a vehicle having an in-line engine, a transverse gear box comprising:
   a longitudinal engine-driven shaft;
   an input shaft lying on a first transverse shaft line;
   bevel gear means for coupling the engine-driven shaft to the input shaft;
   an output shaft lying on a second transverse shaft line parallel to the first transverse shaft line;
   a change-speed gear coupled between the input shaft and the output shaft;
   an epicyclic range gear on one of the shaft lines, the epicyclic range gear driving the input shaft;
   a pair of half-shafts on the second shaft line;
   a differential gear between the output shaft and the pair of half-shafts; and a hollow shaft driven by the bevel gear means, the hollow shaft driving the epicyclic range gear, the input shaft extending through the hollow shaft from the epicyclic range gear to the change-speed gear.

3. The transverse gear box of claim 2, further comprising:
a creep gear on the first shaft line; and
means for coupling the creep gear to the hollow shaft.

4. The transverse gearbox of claim 3, wherein the bevel gear means comprises:
a drive bevel gear meshing with first and second oppositely rotating bevel gears rotatably mounted on the hollow shaft; and
forward and reverse clutches disposed between the hollow shaft and the first and second bevel gears, respectively, the creep gear comprising an epicyclic gear which reverses its sense of rotation, and the means for coupling comprising a creep clutch between the second bevel gear and the hollow shaft.

5. The transverse gear box of claim 4, wherein the range gear comprises:
a two-stage epicyclic gear with an input annulus fixed with respect to the hollow shaft; and
means for selectively actuating the stages.

6. The transverse gearbox of claim 5, further comprising:
a direct drive clutch between the input annulus and the input shaft.

7. The transverse gearbox of claim 5, wherein:
the input annulus is fixed with respect to an output annulus of the creep gear.

8. The transverse gearbox of claim 7, wherein:
the creep gear has a non-rotating planet wheel carrier; and
the creep clutch is between the second bevel gear and a sun wheel of the creep gear.

* * * * *